Oct. 28, 1930.  F. E. RYDER  1,779,781
ADJUSTABLE BEARING FOR SPINDLES
Filed March 15, 1929

F. E. Ryder
INVENTOR
By: Marks & Clerk
Attys.

Patented Oct. 28, 1930

1,779,781

UNITED STATES PATENT OFFICE

FRANK EATOCK RYDER, OF BOLTON, ENGLAND

ADJUSTABLE BEARING FOR SPINDLES

Application filed March 15, 1929, Serial No. 347,310, and in Great Britain March 24, 1928.

This invention relates to adjustable bearings for spindles and particularly to the spindles of vertical automatic turning and like machine tools of the type comprising an intermittently rotating bed whereon a plurality of work pieces are mounted and are brought in due order, by the rotary movements of the said bed, into the correct positions to be operated upon by a series of tools or cutters, the work pieces being rotated whilst under the action of the tools.

The object of the present invention is to provide simple and convenient means for the ready and accurate adjustment or setting of the multiple rotatable headstocks or spindles of the said intermittently rotating bed.

The invention comprises the improved construction and arrangement of the means for adjusting the bearings of spindles as hereinafter described and claimed.

Referring to the accompanying sheet of explanatory drawings:—

The same reference letters in the different views indicate the same parts.

Figure 1:
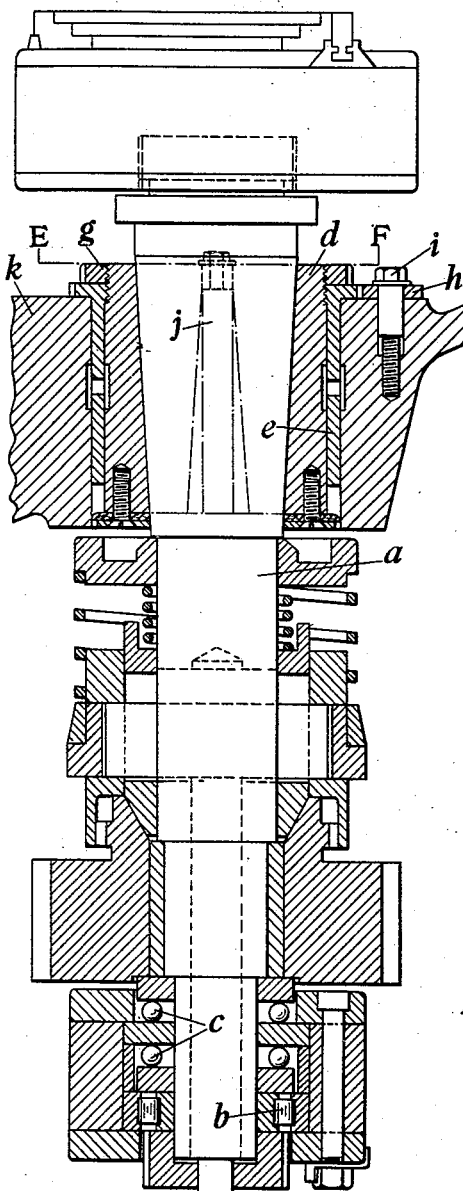
Figure 1 is a sectional elevation on the line A B of Figure 3 of the spindle adjusting means and bearings.
Figure 2:
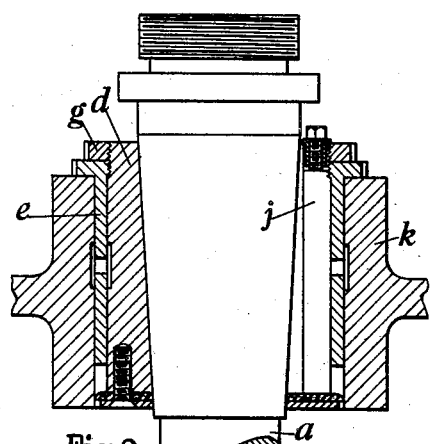
Figure 2 is a sectional elevation on the line C D of Figure 3 of the spindle adjusting means.
Figure 3:
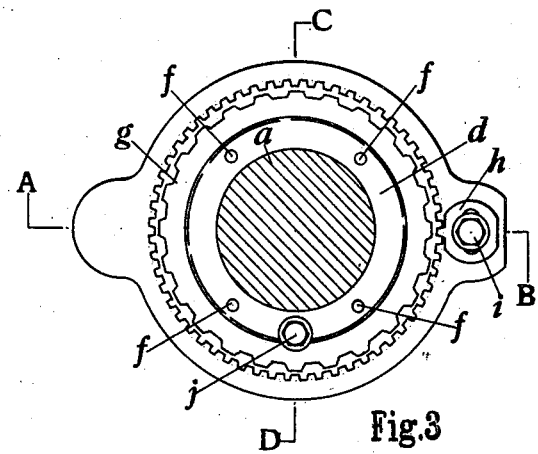
Figure 3 is a sectional plan view on the line E F of Figure 1.

The bearing for the lower end of each spindle *a* comprises one or more rings or groups of rollers *b* in association with one or more rings or groups of balls *c*, the latter being adapted to take up end thrusts.

For the upper end of the spindle the bearing comprises a pair of sleeves *d*, *e* disposed the one within the other, the bore of each sleeve being slightly eccentric, and the inner one conical to suit the coned portion of the spindle *a*. The sleeve *d* has tommy holes *f* therein for the insertion of a tommy bar by which the sleeve is turned for adjustment purposes. The collar or nut *g* serves to draw the conical sleeve *d* upwards to adjust the bearing for wear. The sleeve *e* has a toothed periphery which can be engaged by a key for adjustment purposes. It is locked by the toothed plate *h* secured by the screwed stud *i*. The two sleeves *d* and *e* are split longitudinally and a wedge bolt *j* is arranged in the slit in the inner sleeve so that by tightening the same, the two sleeves can be gripped rigidly within the fixed headstock *k*.

What I claim is:—

1. An adjustable bearing for a spindle comprising, in combination, two relatively adjustable split excentric sleeves disposed one within the other around the spindle and within the spindle headstock, a wedge bolt within the slit in the inner sleeve, and means for adjusting said bolt in said slit to expand the inner sleeve against the outer one and so bind the two sleeves within the headstock.

2. An adjustable bearing for a spindle comprising, in combination, an inner split excentric sleeve around the spindle with tommy holes in its upper end for its rotary adjustment, an outer split excentric sleeve with a flanged and toothed upper end around the said inner sleeve, a headstock surrounding said outer sleeve, a wedge bolt extending down the slit in the inner sleeve with a screw threaded end piece, and a nut upon said threaded end for moving said wedge bolt longitudinally and expanding the inner sleeve.

3. In an adjustable bearing for a spindle as claimed in claim 1, the provision of means for adjusting one of the split sleeves which has a conical or wedge surface, longitudinally to adjust the upper bearing of the spindle which has a conical surface for wear.

4. An adjustable bearing for a spindle comprising, in combination, an inner split excentric sleeve with a conical inner surface around the spindle with tommy holes in its upper end and screw threaded at its periphery towards such end, an outer split excentric sleeve with a flanged and toothed upper end around the said inner sleeve, a headstock around said outer sleeve, a wedge bolt extending down the slit in the inner sleeve with a screw threaded end part, a nut upon said threaded end for moving said wedge bolt longitudinally and expanding the inner sleeve and a collar threading on to the threaded periphery of the inner sleeve and bearing on the top of the outer sleeve for moving said inner sleeve axially with relation to the outer sleeve.

In testimony whereof I have signed my name to this specification.

FRANK EATOCK RYDER.